July 23, 1940.     H. SPITZER     2,208,707
MENSURATION DEVICE
Filed Aug. 1, 1938     2 Sheets-Sheet 2
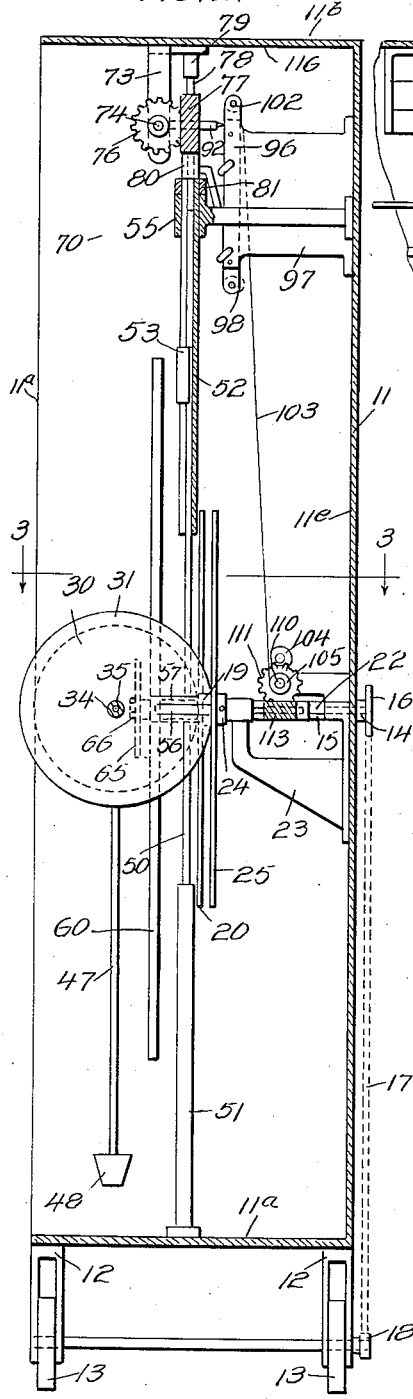
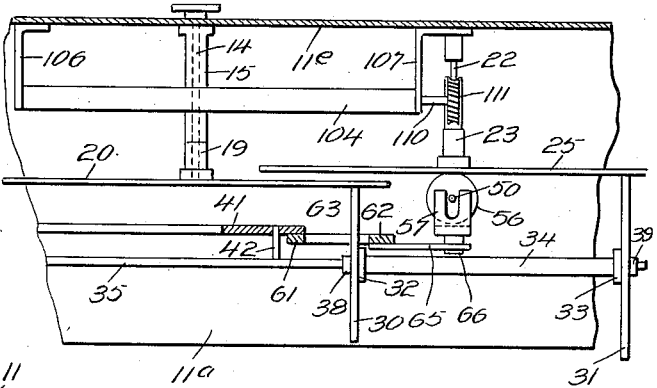
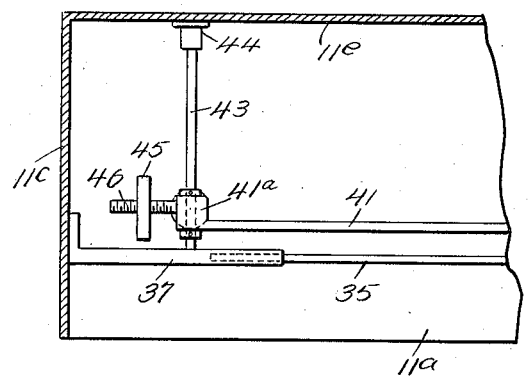
HAROLD SPITZER,
INVENTOR
BY Victor J. Evans & Co.
ATTORNEYS Patented July 23, 1940

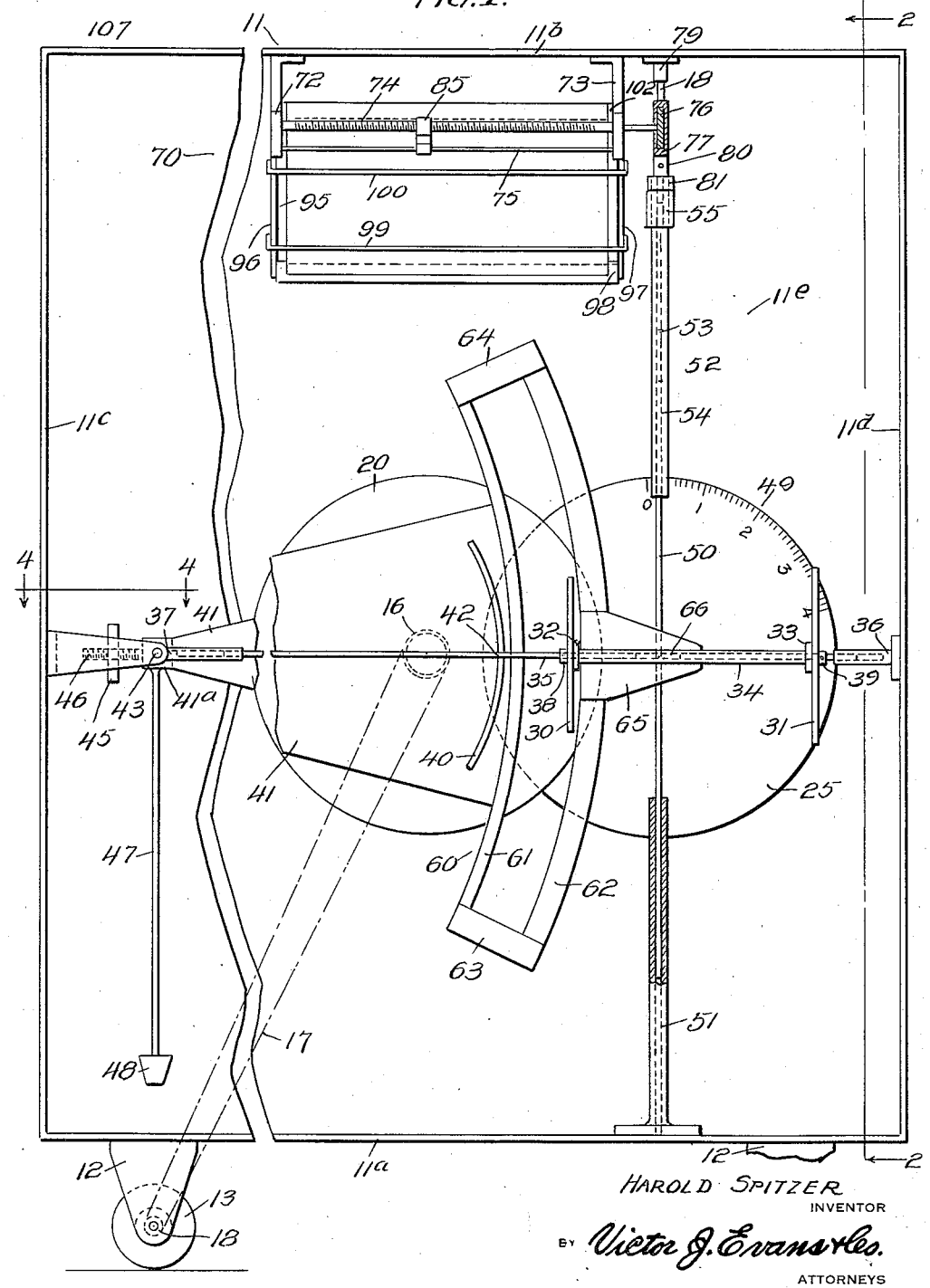

2,208,707

UNITED STATES PATENT OFFICE 2,208,707

MENSURATION DEVICE

Harold Spitzer, Brooklyn, N. Y.

Application August 1, 1938, Serial No. 222,544

4 Claims. (Cl. 33—141.5)

This invention relates to devices for measuring distances along surfaces and more especially to a device for ascertaining and registering absolute horizontal distances by rolling said device over terrain.

In surveying, it is customary to determine absolutely horizontal distances by actual measurement of portions of the terrain and calculation according to well known trigonometric formulae. This procedure is disadvantageous in many instances, inasmuch as it necessitates measurement of angles by means of transits or the like, together with computation based upon observed distances and observed changes in slope, whereby experimental errors are often of such importance as to vitiate results unless extreme care is taken in making observations and measuring distances. A further disadvantage of this method of ascertaining absolute horizontal distances is that if it is desired to obtain a terrain profile, it is necessary to plot observed values upon suitable coordinate paper with resultant loss of time and in some instances, duplication of work.

Moreover, mensuration of terrain by surveyors' level, rod and tape, introduces experimental errors which often vitiate results, in addition to being troublesome and time consuming.

It is among the more important objects of the present invention to provide a device adapted to being rolled upon terrain which will register the vertical and horizontal projection of the distance traversed and will also provide a terrain profile record of the surface over which the device has been rolled.

Another object of the present invention is to provide a device adapted to being rolled over other than horizontal terrain, including means actuable by variation in slope of the terrain, for recording said variation in slope and presenting a graphic record of the vertical projection of the terrain profile plotted against a horizontal projection thereof or the absolute distance traversed.

Notable among the more important features of the present invention is its adaptability to determine variation profiles with substantial accuracy particularly where the terrain is unusually irregular, inasmuch as the device includes means for automatically compensating in the recording mechanism for any and all variations in slope of the surface over which the device is moved.

Another feature of the device is its relative simplicity: that is to say, it comprises relatively few parts, all of which are of simple construction whereby economies during manufacture are promoted. It is also notable that the elements of the device can be assembled easily without necessitating employment of skilled labor, resulting in a further diminution of the cost of manufacture.

Another feature of the device according to the present invention is that, as compared to other mensuration devices or surveying instruments, it is of relatively rugged construction and accordingly does not become misaligned or out of adjustment during ordinary use. Its ruggedness of construction is also of importance in increasing its useful life, particularly when it is to be used in mensuration of relatively rugged terrain.

Another feature of the device according to the present invention is that it includes means for providing a profile record of the terrain over which the device is moved, said means being adaptable if desired, to exaggerating one of the coordinates of the graphic record.

An important advantage of the device according to the present invention over other equipment used in mensuration of absolute horizontal distance, is that the graphic profile record of the terrain traversed is provided immediately after traversing said terrain and without necessitating calculations or computations of any kind whatever.

Other objects, advantages and features of the device according to the present invention will be apparent to those skilled in the art during the course of the following description.

Regarded in certain of its broader aspects, the present invention comprises a device for measuring absolute horizontal distances, recording same, and recording and measuring variations in vertical projection of a traversed terrain, said device including a driven shaft rotated by movement of the device over the terrain being observed, the rate of rotation of said shaft being observed, the rate of rotation of said shaft being proportional to the rate of travel of the device along the surface of the terrain; a second shaft rotatable by means including said driven shaft, means associating said driven and said second shaft and controlled by variation in slope of the traversed terrain, whereby the rate of rotation of said second shaft is proportional to the absolute distance traversed, recording mechanism associated with said second shaft for providing a visible record of the rotation thereof; a third shaft associated with and driven by said second shaft, means for controlling and varying the rate of rotation of said third shaft in a manner having relationship to the angle of slope in traversed terrain whereby the rate of rotation of said third shaft is proportional to the vertical projection of said traversed terrain, and means actuable by said third shaft for recording the rate of change of rotation thereof upon the record of the rotation of said second shaft, whereby the vertical projection of said traversed terrain is graphically recorded and compared with the absolute horizontal distance traversed by the device. By absolute horizontal distance as the term is used in this specification and in the claims appended thereto, is meant, the absolute horizontal distance or horizontal projection of the surface traversed by the device.

In order to facilitate a fuller and more complete understanding of the present invention, a specific embodiment thereof will be hereinafter described, it being clearly understood, however, that the illustrated embodiment is given solely by way of example and is non-limitative upon the scope of the present invention, except as expressed in the subjoined claims.

Referring then to the drawings:

Figure 1 is substantially a side elevational view of a now preferred embodiment of the present invention with parts broken away for clearness and the cover of the casing removed to expose internal parts.

Figure 2 is substantially a vertical sectional view of Figure 1, taken along the line 2—2.

Figure 3 is substantially a horizontal sectional view of Figure 2, taken along the line 3—3.

Figure 4 is essentially a fragmentary horizontal sectional view of Figure 1, taken along the line 4—4; and Figure 5 is substantially a side elevational view, with parts broken away for clearness, of the presently preferred stylus mounting.

Referring now to the drawings and especially to Figures 1 and 2 thereof, it will be noted that the device, generally designated by the numeral 10, comprises a box-like frame 11, substantially rectangular in vertical cross sectional outline and having a bottom 11a and top portion 11b with sides 11c and 11d. One end of the casing, 11e, is preferably formed integral with the top and sides; the other end of the casing is preferably closed by means of a cover not shown. A plurality of yokes, some of which are designated by the numeral 12, are mounted near the corners of the bottom 11a of the casing 11 and carry freely rotatable wheels 13 mounted on axles journalled in the arms of said yokes whereby rolling of said casing over terrain is facilitated.

A shaft 14, rotatably mounted in a bearing 15 attached to the casing end portion 11e, is provided, on an end portion thereof projecting outside the casing, with a pulley 16 substantially fixedly mounted on said shaft and connected by means of a belt 17 with a pulley 18, rotatable by one of the wheels 13, whereby said shaft 14 is rotated by rolling the casing on the wheels 13. The opposite end of the shaft 14 carries a collar 19 fixedly secured thereto and having mounted thereon an essentially flat disc 20, circular in outline, rotatable by said shaft. For convenience of description, the disc 20 will be hereinafter referred to as the driving disc. A second shaft 22, mounted in an opening formed in the casing end 11e and freely rotatably supported by the bracket bearing 23, carries a collar 24 on the end thereof, distal relative to the casing end, said collar having fixedly attached thereto a second disc 25, positioned adjacent the driving disc 20 but slightly behind same, whereby free rotation of said disc 25 does not interfere with rotation of the driving disc.

Rotation of the driving disc 20 produces rotation of the disc 25 by engagement of discs 30 and 31 with the discs 20 and 25 respectively. The discs 30 and 31 are mounted, by means of collars 32 and 33 respectively, on end portions of a hollow substantially cylindrical tubular member 34, said tubular member 34 being freely rotatably mounted on a shaft 35, held in bearings 36 and 37, the bearing 36 being fixedly mounted on the side 11d of the casing and the bearing 37 being mounted on the casing side 11c. It is to be noted that the peripheral parts of the disc 30 engage with the flat surface of the disc 20 and similarly peripheral parts of the disc 31 engage with the flat surface of the disc 25, accordingly, inasmuch as the discs 30 and 31 are mounted upon a common member viz., the tubular member 34, rotation of the disc 20 will result in rotation of the disc 25. Although the tubular member 34 is freely rotatably mounted on the shaft 35 as hereinbefore mentioned, its axial movement along said shaft is restricted by means of the collars 38 and 39 substantially fixedly mounted on said shaft and abutting against the discs 30 and 31 respectively. Inasmuch as the shaft 35 is permitted limited axial movement of the bearings 36 and 37, it will be apparent that said axial movement of said shaft will move the discs 30 and 31 relative to the axis of rotation of the discs 20 and 25 whereby the rate of rotation of the disc 25 relative to the rate of rotation of the disc 20 will be altered.

Control of axial motion of the shaft 35 is effected by means of a segmental cam 40 formed in the cam plate 41 and engaging with a cam rider 42 mounted on the shaft 35, said cam carrying plate 41 being provided with a formation 41a pivotally mounted on the shaft 43, said shaft being journalled in bearing members 44 and 37, substantially as shown in Figure 4, the bearing 44 being attached to the casing end 11e and the bearing member 37 being mounted on the casing side 11c as hereinbefore described. The cam plate 41 is counter-balanced by means of an adjustable counter-weight 45 mounted on a threaded supporting member 46 attached to the formation 41a of the cam plate 41 near the pivotal mounting thereof. A pendulum bar 47 is also substantially fixedly attached to the formation 41a of the cam plate 41 near the pivotal mounting thereof carries, on its free end, a weight 48 arranged whereby variations in slope of terrain traversed by the device will result in rotation of said cam plate 41 upon the shaft 43. It will be evident then, that axial movement of the shaft 35 is produced by variation in slope of the traversed terrain whereby the ratio of rates of rotation of the discs 20 and 25 is altered in a degree proportional to the change of slope.

It will be apparent that if $r_1$ is the radius of the disc 20, that is to say, the effective radius, namely, the distance between the axis of rotation of said disc and the place of abutment of the disc 30 thereagainst, the distance traveled by the point on the periphery of the circle defined by said radius would be $2\pi r_1 n_1$ wherein $n_1$ is the number of rotations of said disc per unit time. Similarly, the distance traveled by a point on the periphery of the disc 30 would be $2\pi r_2 n_2$ wherein $r_2$ and $n_2$ are respectively the radius and number of rotations in unit time of said disc. In like manner, the distance traveled by a point on the periphery on the disc 31 would be $2\pi r_3 n_3$ wherein $r_3$ and $n_3$ are respectively the radius and rate of rotation of the disc. But it will be noted that inasmuch as discs 30 and 31 are mounted upon the member 34, $n_2$ is equal to $n_3$ accordingly, a point on the disc 31 would travel a distance $2\pi r_3 n_2$. In analogous manner, a point on a circle having a radius equal to the distance between the axis of rotation of the disc 25 and the place of abutment of the disc 31 thereagainst would be $2\pi r_4 n_4$ wherein $r_4$ and $n_4$ are the effective radius and rate of rotation of said disc 25. Manifestly, $n_2$ is equal to the fraction $2\pi r_1 n_1$ over $2\pi r_2$ and inasmuch as $n_4$ is equal to the fraction $2\pi r_3 n_2$ over $2\pi r_4$, $n_4$ is equal to the fraction $r_1 r_3 n_1$ over $r_2 r_4$. If X represents the distance of axial movement of the shaft 35, it will be evident that $n_4$ is equal to the fraction:

$$n_4 = \frac{(r_1 - X) r_3 n_1}{(r_4 - X) r_2}$$

Since it is desired that the rate of rotation of the disc 25 have direct relationship to the absolute horizontal distance traversed by the device, the cam 40 is cut whereby the foregoing relationship is maintained:

$$\frac{(r_1 - X) r_3}{(r_4 - X) r_2} = \cos \phi$$

wherein $\phi$ is the angle of slope.

The ratio $$\frac{r_1}{r_4}$$

is made equal to $$\frac{r_2}{r_3}$$

so that in its initial position on level ground, when the displacement X is zero, the fraction become unity. Under these conditions, $n_4$ is equal to $n_1 \cos \phi$, and the rate of rotation of the disc 25 is directly proportional to the absolute horizontal distance traversed.

Indicia generally designated by the numeral 49 are provided on peripheral parts of the disc 25 and, when taken in conjunction with the number of rotations of said disc, permit direct reading of the absolute horizontal distance traversed.

The means for determining and registering the vertical projection of the traversed terrain will now be described. A vertically positioned, freely rotatable shaft 50 is axially slidably mounted within the casing 11 in bearings 51 and 52, it being noted that the upright bearing member 51 is substantially fixedly mounted on the bottom 11a of said casing. The bearing 52 is essentially a slotted sheath and is rotatable with and by the shaft 50 through engagement of a projecting key-like member 53 with a slot 54 formed in the side of said sheath 52, the upper part of the sheath being rotatably mounted in a supported bearing 55 essentially fixedly secured to the back 11e of the casing. A wheel-like roller 56, essentially fixedly mounted on the shaft 50, engages with a bifurcated yoke 57 whereby axial movement of said shaft 50, by means of said yoke, can be produced as will be hereinafter described.

A frame 60, mounted on the cam plate 41 and comprising segmental curved elements 61 and 62, joined by cross pieces 63 and 64 at the ends thereof, carries a radially grooved projecting member 65 having a block 66 slidably mounted in said groove, said block 66 being pivotally attached to the yoke 57 hereinbefore referred to. Inasmuch as the member 65 is mounted upon and moves in conjunction with the cam plate 41, it will be evident that the shaft 50 will be axially moved in its bearings by movement of said cam plate 41 on its pivotal mounting by engagement of the yoke 57 with said roller 56 as hereinbefore described.

The wheel-like roller 56 abuts against and frictionally engages with the flat surface of the disc 25 hereinbefore described, accordingly, as said roller is radially moved across said disc by movement of said cam plate 41, the shaft 50 will be rotated, the direction of rotation being dependent upon whether the roller is positioned upon one side of the axis of rotation of the disc 25 or upon the other side thereof.

It will be evident that the rate of rotation of the shaft 50 will be proportional to the rate of rotation of the disc 25 and also proportional to the distance from the axis of rotation of the disc 25 to the place of abutment of the wheel 56 thereagainst. In the presently preferred embodiment of the instant invention, the relationship existing between the rate of rotation of the disc 25 and the rate of rotation of the shaft 50 is expressed by the formula:

$$\frac{n_6}{n_5} = \frac{y \tan \phi}{r_6}$$

wherein $\phi$ is the angle of slope and $y$ is the distance from the axis of movement of the cam plate 41 to the pivot point of the yoke 57. This expression is derived as follows: if $r_5$ is the effective radius of the disc 25 as regards the roller 56, and $r_6$ is the radius of said roller, the rates of rotation of the disc and shaft being designated respectively by $n_5$ and $n_6$, it will be evident that the distance traveled by a point on the circumference of a circle having radius $r_5$ would be $2\pi r_5 n_5$. Inasmuch as $r_5$ is determined by movement of the pendulum actuated cam plate 41, it will be evident that $r_5$ is equal to the product of $\tan \phi$ and the distance between the pivotal point of the cam plate 41 and the pivotal point of the yoke 57. Accordingly, it will be evident that the rate of rotation of the shaft 50, $n_6$ will be equal to the fraction $2\pi y\, n_5 \tan \phi$ over $2\pi r_6$ wherein $y$ is the distance between the pivotal points of the yoke and of cam plate hereinbefore referred to. It will be apparent then that the rate of rotation of the shaft 50 will be substantially directly proportional to the vertical projection of the traversed terrain.

It will be seen that, in the manner hereinbefore described, the device according to the instant invention includes a plurality of shafts, one of said shafts rotating at a rate proportional to the absolute distance traversed, that is to say, the horizontal projection of the surface traversed, and another shaft rotating at a rate proportional to the vertical projection of the traversed terrain. The manner in which the recording of these rates of rotation is accomplished will now be described. The recording apparatus, generally designated by the numeral 70 and located near the upper portion of the casing 11, comprises a pair of mounting standards 72 and 73, substantially fixedly secured to the casing top 11b and extending downwardly therefrom, said standards having openings formed therein adapted to receive and rotatably hold a threaded rod 74 and also a guide rod 75 substantially as shown in Figures 1 and 2. An end portion of the threaded rod 74 is provided with a pinion gear 76 engageable with a worm gear 77 mounted on a shaft 78 journalled in bearings 79 and 80, said shaft 78 being connected to and rotatably by the collar 81 mounted on an end portion of the bearing 52 of the shaft 50, whereby rotation of the shaft 50 results in rotation of the threaded rod 74, the direction of rotation of said threaded rod 74 being determined of course, by the algebraic sign of the angle of slope. A rider 85, engaging with the threaded portions of the rod 75 and guided by the rod 75, is moved along said rod 74 by rotation thereof. Referring now especially to Figure 5 wherein details of the rider are best illustrated, it will be noted that it comprises a block-like body portion 86 having an opening 87 formed therein adapted to receive the guide rod 75 and an opening 88 formed therein adapted to receive a threaded rod 74. A spring pressed block 89 having thread formations on a face thereof is normally positioned with the threads projecting into the interior of the opening 88, but is retractable by means of the knob 90 whereby said threaded portion can be disengaged from the rod 74 when the device is in use, thereby permitting free sliding motion of said rider along said rod for purposes of setting or adjustment of the stylus 92 mounted on said rider. An essentially planar member 95, fixedly mounted in standards 96 and 97 attached to the rear wall 11e of the casing 11, is arranged whereby paper positioned on said surface engages with said stylus 92 and receives markings therefrom. A roll of sheet material such as paper or the like, preferably stored in a can 98, extends therefrom and held flat by arms 99 and 100, passes over said planar surface beneath said stylus 92 and over a roller 102 mounted at the top of said surface substantially as shown in Figures 1 and 2 and an end portion thereof, designated by the numeral 103, is positioned between and drawn by rollers 104 and 105, being thereafter received in a suitable receptacle, not shown. The rollers 104 and 105 are mounted in standards 106 and 107, essentially fixedly attached to the back 11e of the casing, the roller 105 being mounted upon and rotatable by a shaft 110 having a pinion gear 111 mounted on a projecting end portion thereof engageable with a worm gear 113 mounted upon and rotatable by the shaft 22, whereby as the disc 25 is rotated, the paper 103 is drawn past the stylus 92 and between the rollers 104 and 105.

It will be apparent then that the paper 103 is drawn between the rollers 104 and 105 at a linear rate of travel directly proportional to the absolute horizontal distance traversed by the device inasmuch as the rollers 104 and 105 are rotated by means driven by rotation of the disc 25. It will also be evident, in the light of the foregoing description, that the threaded rod 74 will be rotated in different directions depending upon the algebraic sign of the slope of the traversed terrain and that the rate of rotation of said threaded rod 74 will be essentially directly proportional to and determined by the vertical variation of said terrain. Accordingly, the stylus 92 will indicate upon the paper 103 passed thereunder, both the change in position of the rider 85 as it moves along the threaded rod 74 and also will indicate the length of paper passed under said stylus and drawn by said rollers 104 and 105. In this manner, a graphic record is obtained of the horizontal and of the vertical projection of the traversed terrain, that is to say, a profile record of the surface traversed.

It will of course be understood by those skilled in the art that the graphic record of the traversed terrain profile can be distorted, if desired, by exaggerating the horizontal or the vertical projection thereof, this being easily accomplished by variations in pitch or ratio of the gears 74 and 77 or of the gears 111 and 113. For instance, if it is desired to exaggerate the vertical projection of the terrain profile, the ratio of the gears 76 and 77 is adjusted, whereby the rider 85 traverses a relatively large proportion of the length of the threaded rod 74 as a result of the relatively small changes in slope of the traversed terrain. Conversely, by altering the ratio of said gears in the opposite direction, the horizontal projection of the terrain profile can be exaggerated.

To register the vertical projection of the distance traversed, the rotation of the threaded rod 74 will be indicated by a mechanical counter not shown on the drawings.

It is to be understood that this improvement is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed as new is:

1. In a portable terrain profile recording device mounted on wheels a first shaft coupled to and rotated by travel of the device over the terrain, a recording mechanism and a second shaft driving the recording mechanism, the improved means for coupling the first with the second shaft comprising a first disc mounted on said first shaft and a second disc mounted on said second shaft; a first and second coactive friction wheel, the first friction wheel riding on the first disc and the second friction wheel riding on the second disc.

2. In a portable terrain profile recording device mounted on wheels a first shaft coupled to and rotated by travel of the device over the terrain, a recording mechanism and a second shaft driving the recording mechanism, the improved means for coupling the first with the second shaft comprising a first disc mounted on said first shaft and a second disc mounted on said second shaft, the discs lying in essentially parallel spaced planes; a first and a second friction wheel mounted on a common shaft, the first friction wheel being of different diameter from the second friction wheel, the first friction wheel riding on and taking power from the first disc and the second friction wheel riding on and driving the second disc.

3. In a portable terrain profile recording device mounted on wheels a first shaft coupled to and rotated by travel of the device over the terrain, a recording mechanism and a second shaft driving the recording mechanism, the improved means for coupling the first with the second shaft comprising a first disc mounted on said first shaft and a second disc mounted on said second shaft, the discs lying in essentially parallel spaced planes; a first and a second friction wheel mounted on a common shaft, the first friction wheel being of different diameter from the second friction wheel, the first friction wheel riding on and taking power from the first disc and the second friction wheel riding on and driving the second disc; and means for moving said first and second friction wheels radially on said first and second discs respectively whereby the ratio of rotation of the first and second shafts is altered.

4. In a portable terrain profile recording device mounted on wheels a first shaft coupled to and rotated by travel of the device over the terrain, a recording mechanism and a second shaft driving the recording mechanism, the improved means for coupling the first with the second shaft comprising a first disc mounted on said first shaft and a second disc mounted on said second shaft, the discs lying in essentially parallel spaced planes; a first and a second friction wheel mounted on a common shaft, the first friction wheel being of different diameter from the second friction wheel, the first friction wheel riding on and taking power from the first disc and the second friction wheel riding on and driving the second disc; and means for moving said first and second friction wheels radially on said first and second discs respectively whereby the ratio of rotation of the first and second shafts is altered, said means comprising a pendulum controlled rotating cam acting upon parts of said first and second friction wheels.

HAROLD SPITZER.